| (12) | United States Patent<br>Tang et al. | (10) Patent No.: US 10,430,669 B2<br>(45) Date of Patent: Oct. 1, 2019 |
|---|---|---|

(54) METHODS, SERVERS AND SYSTEMS FOR OPERATING ON SECURITY INSPECTION DATA

(71) Applicant: Nuctech Company Limited, Beijing (CN)

(72) Inventors: Hu Tang, Beijing (CN); Li Zhang, Beijing (CN); Zhiqiang Chen, Beijing (CN); Jiamin Zhang, Beijing (CN)

(73) Assignee: Nuctech Company Limited, Beijing (CN)

( * ) Notice: Subject to any disclaimer, the term of this patent is extended or adjusted under 35 U.S.C. 154(b) by 0 days.

(21) Appl. No.: 15/719,309

(22) Filed: Sep. 28, 2017

(65) Prior Publication Data

US 2018/0137371 A1    May 17, 2018

(30) Foreign Application Priority Data

Nov. 15, 2016    (CN) .......................... 2016 1 1029778

(51) Int. Cl.
*G06K 9/00* (2006.01)
*H04N 7/18* (2006.01)
(Continued)

(52) U.S. Cl.
CPC ..... *G06K 9/00771* (2013.01); *G06K 9/00979* (2013.01); *H04L 67/32* (2013.01);
(Continued)

(58) Field of Classification Search
CPC ........... G06K 9/00771; G06K 9/00979; G06K 2209/09; H04N 21/2335; H04N 7/18; H04L 67/32; G08B 13/196
See application file for complete search history.

(56) References Cited

U.S. PATENT DOCUMENTS

| 8,773,532 B2 | 7/2014 | Wengrovitz et al. |
| 9,947,067 B2 | 4/2018 | Chen et al. |
| 2008/0240578 A1 * | 10/2008 | Gudmundson ...... G01V 5/0083 382/218 |

(Continued)

FOREIGN PATENT DOCUMENTS

| CN | 102567960 A | 7/2012 |
| CN | 104822047 A | 8/2015 |

(Continued)

OTHER PUBLICATIONS

Extended European Search Report dated Mar. 20, 2018 in European Application No. 17194179.2, 7 pgs.

(Continued)

*Primary Examiner* — Amara Abdi
(74) *Attorney, Agent, or Firm* — Knobbe, Martens, Olson & Bear, LLP (57) ABSTRACT

A method, server and system for operating on security inspection data is disclosed. In one aspect, an example method performed by a server for operating on security inspection data includes receiving an operation request for target security inspection data from a client through a network. The target security inspection data is loaded from a storage server based on the operation request. Image processing on the loaded target security inspection data is performed. The processed target security inspection data or a graphic interface including the processed target security inspection data is encoded. The encoded target security inspection data or graphic interface is transmitted to the client through the network in a video stream.

18 Claims, 4 Drawing Sheets

(51) Int. Cl.
*H04N 21/233* (2011.01)
*H04L 29/08* (2006.01)
*G08B 13/196* (2006.01)

(52) U.S. Cl.
CPC ........... *H04N 7/18* (2013.01); *H04N 21/2335* (2013.01); *G06K 2209/09* (2013.01); *G08B 13/196* (2013.01)

(56) References Cited

U.S. PATENT DOCUMENTS

| | | | |
|---|---|---|---|
| 2009/0031381 A1* | 1/2009 | Cohen | H04L 29/08846 725/115 |
| 2010/0232518 A1 | 9/2010 | Coleman et al. | |
| 2012/0314018 A1* | 12/2012 | Wengrovitz | H04N 7/181 348/14.08 |
| 2013/0111051 A1* | 5/2013 | Yaron | H04N 21/234363 709/231 |
| 2014/0118541 A1 | 5/2014 | Kim | |
| 2015/0379677 A1 | 12/2015 | Chen et al. | |

FOREIGN PATENT DOCUMENTS

| | | |
|---|---|---|
| CN | 105338015 A | 2/2016 |
| CN | 105637886 A | 6/2016 |
| CN | 105827957 A | 8/2016 |
| CN | 205656319 U | 10/2016 |
| JP | 2016004285 A | 1/2016 |
| WO | WO 01/16764 A1 | 3/2001 |

OTHER PUBLICATIONS

International Search Report and Written Opinion dated Sep. 27, 2017 in PCT Application No. PCT/CN2017/095844.
Office Action dated Aug. 28, 2018 for Canadian Patent Application No. 2,982,065, which corresponds in priority to the above-identified subject U.S. application.
Office Action dated Sep. 14, 2018 for Australian Patent Application No. 2017232056, which corresponds in priority to the above-identified subject U.S. application.

* cited by examiner

METHODS, SERVERS AND SYSTEMS FOR OPERATING ON SECURITY INSPECTION DATA

CROSS-REFERENCE TO RELATED APPLICATION(S)

The present application claims priority to Chinese Patent Application No. 201611029778.0, filed on Nov. 15, 2016, which is incorporated herein by reference in its entirety.

TECHNICAL FIELD

The disclosed technology relates to the field of security inspection, and more particularly, to a method, server and system for operating on security inspection data.

BACKGROUND

Security inspection systems are widely used in important places, such as airports, train stations, various venues, customs, ports and so on, to inspect people, bags, goods and containers, etc., so that prohibited goods or smuggled goods can be found before illegally passing. These security inspection systems typically comprise a scanning device for scanning inspected objects to generate images of the inspected objects and an image analysis workstation for analyzing the images. As the technical principles of the scanning devices are different, original scanned images generated by these scanning devices are different. These original scanned images (or preprocessed images which are obtained by pre-processing the original scanned images to eliminate individual differences among devices, which are collectively referred to as security inspection data hereinafter) are related to physical properties of the inspected objects and are often not suitable to be directly viewed by security inspection staff, and therefore the image analysis workstation needs to perform further image processing on the security inspection data to generate post-processed images suitable to be viewed by people and then the post-processed images may be used by the security inspection staff to perform image analysis. Further, the security inspection staff may use the image analysis workstation to perform a variety of image processing and operations on the security inspection data to analyze the inspected objects from different perspectives.

The security inspection systems are often deployed with a storage device or a storage server having a processor and a memory. A scanning device may directly transmit the security inspection data to the image analysis workstation for image processing or may also store the security inspection data on the storage device, and the security inspection data is obtained by the image analysis workstation from the storage device and then image processing and operations are performed by the security inspection staff on the security inspection data.

Figure 1:
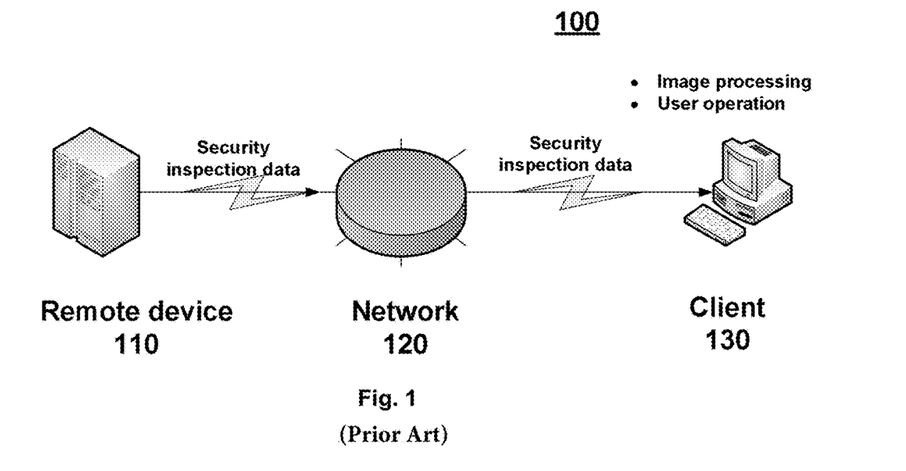
FIG. 1 illustrates architecture of a conventional system for operating on security inspection data.

FIG. 1 illustrates architecture of a conventional system or operating on security inspection data. In this system, a remote device 110 selectively stores security inspection data after obtaining the security inspection data from a security inspection device and then transmits an image to a client 130 through a network 120. After receiving the security inspection data, the client 130 performs image processing as needed.

However, this solution has disadvantages, including at least the following examples:

1. the security inspection data is often in formats which are private to various manufacturers, and which lack a uniform standard. Therefore, it often needs to use image processing clients belonging to the various manufacturers for image processing and presentation, which results in poor universality of the clients, a high cost, and poor inconvenience;

2. security inspection data files are transmitted from the storage device to the client, which easily leads to leakage of image files, and is lack of security;

3. image processing algorithms are often the core technology of various security inspection manufacturers, and if the image processing algorithms are deployed on a client, there is a risk of secret leakage;

4. different security inspection devices (for example, ordinary X-ray machines and CT devices) generate image data which has a large difference in size, and have high requirements for network conditions in usage sites, for example, often require a 100 Mbit network or even a Gigabit network; and 5. some processing or rendering of the security inspection data has high requirements for client devices, and therefore it needs to configure a client device with high performance resulting in a high cost.

SUMMARY

In order to solve at least a part of the above problems in the conventional technology, the disclosed technology proposes a method, server and system for operating on security inspection data.

According to an aspect of the disclosed technology, there is proposed a method performed by a server for operating on security inspection data. The method comprises: receiving an operation request for target security inspection data from a client through a network; loading the target security inspection data from a storage server based on the operation request; performing, by an image processing module, image processing on the loaded target security inspection data; encoding the processed target security inspection data or a graphic interface including the processed target security inspection data; and transmitting the encoded target security inspection data or graphic interface to the client through the network in a video stream.

In one embodiment, the security inspection data is acquired by a plurality of security inspection devices including a plurality of security inspection ports respectively, and the target security inspection data is acquired by a target security inspection port located at a target security inspection device.

In one embodiment, the server selects one of a plurality of data loading applications according to parameter information of the target security inspection data to load the target security inspection data from the storage server, and the server performs image processing on the loaded target security inspection data using an image processing module corresponding to the selected data loading application.

In one embodiment, the parameter information of the security inspection data comprises at least one of security inspection device index information, security inspection port information, security inspection data format information and security inspection data quality information.

In one embodiment, the operation request comprises an initial operation instruction which comprises an instruction for specifying the target security inspection data.

In one embodiment, the initial operation instruction further comprises an image parameter instruction, and the step of performing, by the image processing module, image processing on the loaded target security inspection data comprises: performing, by the image processing module, image processing on the loaded target security inspection data according to the parameter information of the security inspection data and/or the image parameter instruction.

In one embodiment, the storage server is a part of the server or is arranged separately from the server.

In one embodiment, after the step of transmitting the encoded target security inspection data or graphic interface to the client through the network in a video stream, the method further comprises: receiving an additional operation instruction from the client; performing, by the image processing module, new image processing on the target security inspection data or graphical interface or performing additional image processing on the previously processed target security inspection data or graphical interface according to the additional operation instruction; encoding the newly processed or additionally processed target security inspection data or graphical interface; and transmitting the encoded target security inspection data or graphic interface to the client through the network in a video stream.

According to another aspect of the disclosed technology, there is proposed a server for operating on security inspection data, comprising: a transceiver configured to receive an operation request for target security inspection data from a client through a network; an image loading unit connected to the transceiver and configured to load the target security inspection data from a storage server based on the operation request; an image processing unit comprising an image processing module connected to the image loading unit and configured to perform image processing on the loaded target security inspection data; and an encoding unit configured to encode the processed target security inspection data or a graphic interface including the processed target security inspection data, wherein the transceiver is further configured to transmit the encoded target security inspection data or graphic interface to the client through the network in a video stream.

In one embodiment, the security inspection data is acquired by a plurality of security inspection devices including a plurality of security inspection ports respectively, and the target security inspection data is acquired by a target security inspection port located at a target security inspection device.

In one embodiment, the image loading unit is configured to select one of a plurality of data loading applications according to parameter information of the target security inspection data to load the target security inspection data from the storage server, and the image processing unit is configured to perform image processing on the loaded target security inspection data using an image processing module corresponding to the selected data loading application.

In one embodiment, the parameter information of the security inspection data comprises at least one of security inspection device index information, security inspection port information, security inspection data format information and security inspection data quality information.

In one embodiment, the operation request comprises an initial operation instruction which comprises an instruction for specifying the target security inspection data.

In one embodiment, the initial operation instruction further comprises an image parameter instruction, and the image processing unit is further configured to: perform, by the image processing module, image processing on the loaded target security inspection data according to the parameter information of the security inspection data and/or the image parameter instruction.

In one embodiment, the storage server is a part of the server or is arranged separately from the server.

In one embodiment, the transceiver is further configured to receive an additional operation instruction from the client; the image processing unit is further configured to cause the image processing module to perform new image processing on the target security inspection data or graphical interface or performing additional image processing on the previously processed target security inspection data or graphical interface according to the additional operation instruction; the encoding unit is further configured to encode the newly processed or additionally processed target security inspection data or graphical interface; and the transceiver is further configured to transmit the encoded target security inspection data or graphic interface to the client through the network in a video stream.

According to another aspect of the disclosed technology, there is proposed a method for operating on security inspection data. The method comprises: transmitting, by a client, an operation request for target security inspection data to a server through a network; receiving, by the server, the operation request, and performing operations of: loading the target security inspection data from a storage server based on the operation request, performing, by an image processing module, image processing on the loaded target security inspection data, encoding the processed target security inspection data or a graphic interface including the processed target security inspection data, and transmitting the encoded target security inspection data or graphic interface to the client through the network in a video stream; and receiving, by the client, the video stream and operating on the received video stream.

According to another aspect of the disclosed technology, there is proposed a system for operating on security inspection data, comprising: a client; and a server in communication with the client through a network, wherein the client is configured to transmit an operation request for target security inspection data to the server through the network; the server is configured to: load the target security inspection data from a storage server based on the operation request, perform, by an image processing module, image processing on the loaded target security inspection data, encode the processed target security inspection data or a graphic interface including the processed target security inspection data, and transmit the encoded target security inspection data or graphic interface to the client through the network in a video stream; and the client is further configured to receive the video stream and operating on the received video stream.

With the method, server and system for operating on security inspection data according to the disclosed technology, the image processing and operation functions are uniformly implemented on a server side, which not only reduces the complexity and cost of the client, but also greatly reduces the risk of leakage of security information of the security inspection data on a client side. In addition, the security inspection data is transmitted in a video stream, which can more flexibly transmit the security inspection data according to network conditions and user needs, save network resources, and improve system performance.

DETAILED DESCRIPTION

The specific embodiments of the disclosed technology will be described in detail below. It should be noted that the embodiments described here are used for illustration only, without limiting the disclosed technology. In the description below, a number of specific details are set forth to provide better understanding of the disclosed technology. However, it is apparent to those of ordinary skilled in the art that the disclosed technology can be implemented without one or more of these specific details disclosed technology Throughout the specification, the reference to "one embodiment," "an embodiment," "one example" or "an example" means that the specific features, structures or properties described in conjunction with the embodiment or example are included in at least one embodiment of the disclosed technology. Therefore, the phrases "in one embodiment," "in an embodiment," "in one example" or "in an example" occurred in various positions throughout the specification may not necessarily refer to the same embodiment or example. Furthermore, specific features, structures or properties may be combined into one or more embodiments or examples in any appropriate combination and/or sub-combination. The disclosed technology will be described in detail below with reference to the accompanying drawings.

In the present application, the terms "operation" may comprise manipulation, transmission, enumeration, processing and other actions which may be performed on security inspection data, and the use of the terms is not intended to limit the protection scope of the disclosed technology.

In the following description of the technical solutions according to the disclosed technology in conjunction with the accompanying drawings, the dimensions, proportions and positional relationships of various elements in the accompanying drawings are merely exemplary, and a connection between the illustrated elements is for the purpose of illustration only, and is not intended to limit the disclosed technology.

Figure 2:
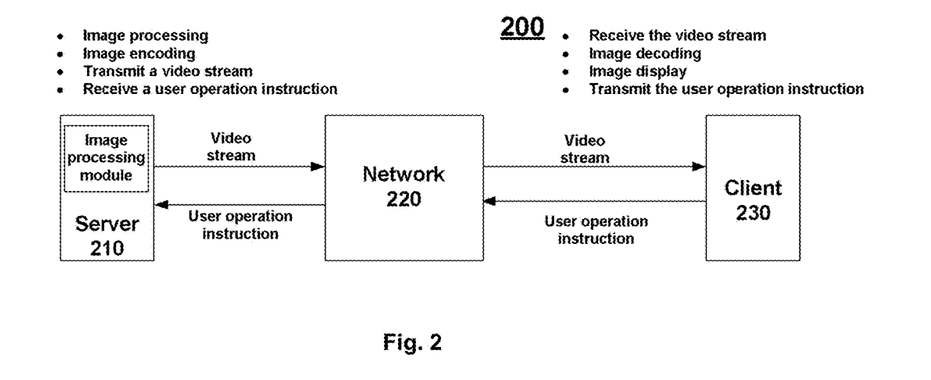
FIG. 2 illustrates architecture of a system for operating on security inspection data according to an embodiment of the disclosed technology.

FIG. 2 illustrates architecture of a system 200 for operating on target security inspection data according to an embodiment of the disclosed technology. The target security inspection data can generally be digital image data. The system 200 comprises a server 210 and a client 230, both of which communicate through a network 220.

The server 210 may be implemented as a physical machine, a virtual machine or a cloud server.

The server 210 may obtain security inspection data acquired by a security inspection device from a storage server. Specifically, the security inspection device may be any type of security inspection device or a security inspection device having any security inspection port. A security inspection device may comprise one or more security inspection ports for performing various types of security inspection functions. For example, the security inspection ports may comprise an X-ray scanning port, an X-ray computed tomography port, a container scanning port, a millimeter wave human body scanning port and a backscattered human body scanning port etc.

In an embodiment, the security inspection data acquired from respective security inspection ports of various security inspection devices are firstly stored in the storage server and then the server 210 may invoke or load specified security inspection data from the storage server when needed (for example, according to a request from the client or a system command).

In another embodiment, the security inspection data acquired from the respective security inspection ports of the various security inspection devices is firstly received by the server 210, and the server 210 stores the received respective security inspection data in the storage server as needed and/or directly performs image processing on the received security inspection data and transmits the processed security inspection data to the client 230 (see below for details). In addition, the server 210 may also invoke or load specified target security inspection data from the storage server when needed.

In one embodiment, the server 210 may load the target security inspection data through a data loading application therein.

In an embodiment, the storage server is a part of the server 210, or both of the storage server and the server 210 may be implemented as different functional components of the same server entity. In another embodiment, the storage server is arranged separately from the server 210 (for example, they are located in different geographic areas), and the storage server and the server 210 communicate through a network (for example, the network 220).

It is to be noted that it needs to receive, store and/or invoke the image parameter information associated with the security inspection data from different security inspection devices together with the security inspection data when receiving, storing and/or invoking the security inspection data. Specifically, the parameter information of the security inspection data may comprise at least one of security inspection device index information, security inspection port information, security inspection data format information, security inspection data quality information and/or image time information etc. The security inspection device index information identifies a security inspection device from which the security inspection data comes; the security inspection port information identifies a security inspection port corresponding to the security inspection data; the security inspection data format information identifies an image format used for the security inspection data; the security inspection data quality information identifies quality, a resolution, a code rate etc. of the security inspection data; and the image time information identifies various times (for example, a start time, an end time, duration, etc.) related to the security inspection data.

It is also to be noted that when the security inspection data is stored, the security inspection data may be stored sequentially in an order of an image data stream acquired from the security inspection device. In another embodiment, the security inspection data may also be stored at a specific time interval (for example, every 1 second, 10 seconds, 30 seconds, etc.)

The server 210 may perform image processing (for example, analysis, rendering, processing, or annotation etc.) on the security inspection data loaded from the storage server. The image processing function may be implemented by an image processing module, which may be implemented as software, hardware, or a combination thereof.

In an embodiment, the image processing module may comprise respective image processing modules corresponding to various security inspection ports, i.e., an X-ray scanned image processing module, an X-ray computed tomography image processing module, a container scanned image processing module, a millimeter wave human body scanned image processing module and a backscattered human body scanned image processing module etc.

The server 210 may further encode the processed security inspection data. In one embodiment, the encoding is low latency encoding.

In addition, the server 210 may transmit the encoded security inspection data to the client for viewing through the network 220. The transmission is performed in a video stream. In an embodiment, the server 210 may further obtain network bandwidth information and adjust parameters of the video stream according to the obtained network bandwidth information.

The client 230 may be implemented as a computer, a workstation, a local server, a mobile phone, a tablet computer or a set-top box etc., or any other terminal device capable of receiving and playing the video stream.

The client 230 may receive the security inspection data which is transmitted by the server 210 in a form of video stream through the network 220 and view the security inspection data after decoding the security inspection data. The decoding corresponds to the encoding at the server 210.

The client 230 is connected to an input device so that a user may input operation instruction information through the input device of the client 230 and the client 230 transmits the operation instruction information to the server 210. Accordingly, after receiving the instruction information, the server 210 may perform a corresponding operation and transmit new security inspection data or modified security inspection data by returning a response or based on the instruction information.

In one embodiment, the input device may comprise a mouse, a keyboard, a handle, a professional keyboard etc.

The network 220 may be a variety of wired or wireless networks commonly used in the art, for example, the Internet, the Ethernet, a mobile communication network, a Bluetooth communication network etc. Although the server 210 and the client 230 are shown in FIG. 2 as different system components from the network 220, it will be understood by those skilled in the art that this is for convenience of description and understanding and it is not intended to limit the system architecture involved in the disclosed technology. The nodes 210 and 230 may be implemented as a part of the network 220 in other embodiments.

Although the architecture in which the server 210 communicates with one client 230 through one network 220 is shown in FIG. 2, it is to be understood that the technical solutions according to the disclosed technology are not limited thereto. The server 210 may communicate with a plurality of clients through the same network or different networks. Specifically, the server 210 may be connected to a plurality of clients 230 through the network, and the server 210 may transmit a plurality of video streams in parallel to the plurality of clients 230.

The various components in the system shown in FIG. 2 are configured to perform particular functions to implement the technical solutions according to the disclosed technology. Specifically, the client 230 is configured to transmit an operation request for target security inspection data to the server through the network. The server 210 is configured to load the target security inspection data from a storage server based on the operation request; perform, by an image processing module, image processing on the loaded target security inspection data; encode the processed target security inspection data or a graphic interface including the processed target security inspection data; and transmit the encoded target security inspection data or graphic interface to the client 230 through the network 220 in a video stream. In addition, the client 230 as illustrated is further configured to receive the video stream and operate on the received video stream.

In an embodiment, the operation request comprises an initial operation instruction which comprises an instruction for specifying the target security inspection data.

In an embodiment, the target security inspection data is acquired by a target security inspection port located at a target security inspection device. In this embodiment, the instruction for specifying the target security inspection data comprises information about a target security inspection device index and/or a target security inspection port index. In one embodiment, the instruction for specifying the target security inspection data may further comprise a time range value (for example, including a start time, an end time and/or duration or a combination thereof).

In one embodiment, the initial operation instruction may further comprise an image parameter instruction. The image parameter instruction instructs a user at the client 230 to set image parameters of the requested security inspection data, for example, the user may specify a resolution of the security inspection data to be received. The server 210 as illustrated may further be configured to perform, by the image processing module, image processing the loaded target security inspection data according to the parameter information of the security inspection data and/or the image parameter instruction.

In an embodiment, the client 230 is further configured to transmit an additional operation instruction to the server 210 through the network 220. The server 210 is further configured to receive the additional operation instruction and perform operations of performing, by the image processing module, new image processing on the target security inspection data or graphical interface or performing additional image processing on the previously processed target security inspection data or graphical interface according to the additional operation instruction; and encoding the newly processed or additionally processed target security inspection data or graphical interface; and transmitting the encoded target security inspection data or graphic interface to the client 230 through the network 220 in a video stream. The client 230 is further configured to receive the video stream and operate on the received video stream.

The additional operation instruction is a feedback from the user after the user has viewed the received target security inspection data. For example, if the user discovers that there is a suspicious item in the received security inspection data but quality of the current security inspection data is insufficient to judge a danger level of the suspicious item, the user may transmit an additional operation instruction through the client 230 to instruct the server 210 to perform image processing on the target security inspection data at a higher resolution.

Figure 3:
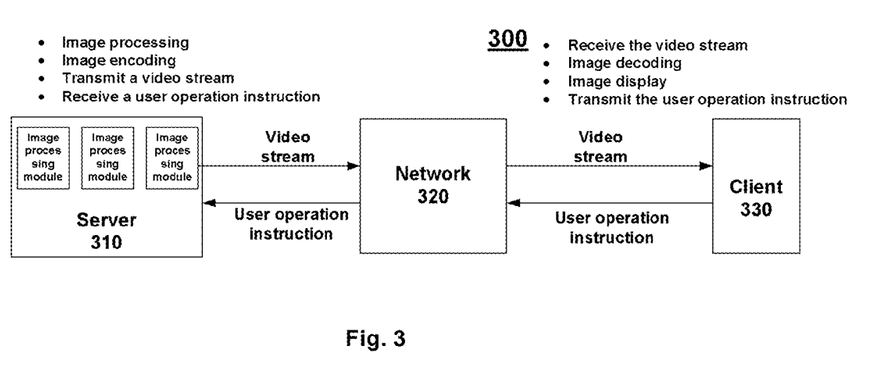
FIG. 3 illustrates architecture of a system for operating on security inspection data according to an embodiment of the disclosed technology.

FIG. 3 illustrates architecture of a system 300 for operating on security inspection data according to an embodiment of the disclosed technology. A server 310 in FIG. 3 differs from the server 210 in FIG. 2 primarily in that the server 310 comprises a plurality of data loading applications and a plurality of image processing modules corresponding to the various data loading applications respectively. The server 310 selects one of the plurality of different data loading applications according to parameter information of the security inspection data, loads the security inspection data using the selected application, and performs image processing on the loaded data using an image processing module corresponding to the selected data loading application after the loading is completed.

Because of the diversity of the security inspection devices, the acquired security inspection data may not be the same, and therefore before the security inspection data is loaded, it may need to judge which means is to be used to load the security inspection data according to parameter information of the security inspection data. The server 310 shown in FIG. 3 may enable a better technical effect by selecting a data loading application and a corresponding image processing module.

Figure 4:
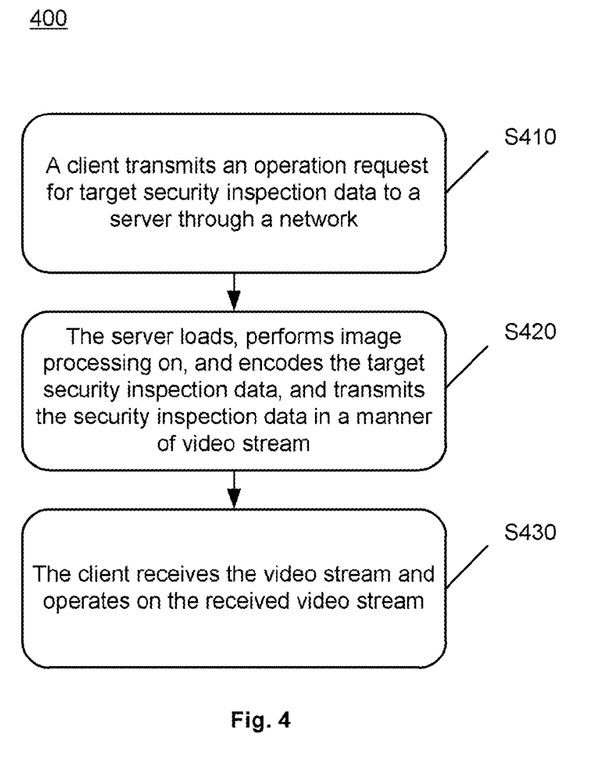
FIG. 4 illustrates a flowchart of a method for operating on security inspection data according to an embodiment of the disclosed technology.

FIG. 4 illustrates a flowchart of a method 400 for operating on security inspection data according to an embodiment of the disclosed technology. The method starts at step S410, where a client transmits an operation request for target security inspection data to a server through a network. Then, in step S420, after receiving the operation request, the server loads the target security inspection data from a storage server based on the operation request; performs, by an image processing module, image processing on the loaded target security inspection data; encodes the processed target security inspection data or a graphic interface including the processed target security inspection data; and transmits the encoded target security inspection data or graphic interface to the client through the network in a video stream. Next, in step S430, the client receives the video stream and operates on the received video stream.

The method 400 shown in FIG. 4 corresponds to the system 200 shown in FIG. 2 for operating on the security inspection data and, is in at least one embodiment, performed by the system 200. Therefore, the above description of the system 200 is applicable here.

The system 300 shown in FIG. 3 is also suitable for performing the method 400, and the above description of the system 300 is equally applicable here.

Figure 5:
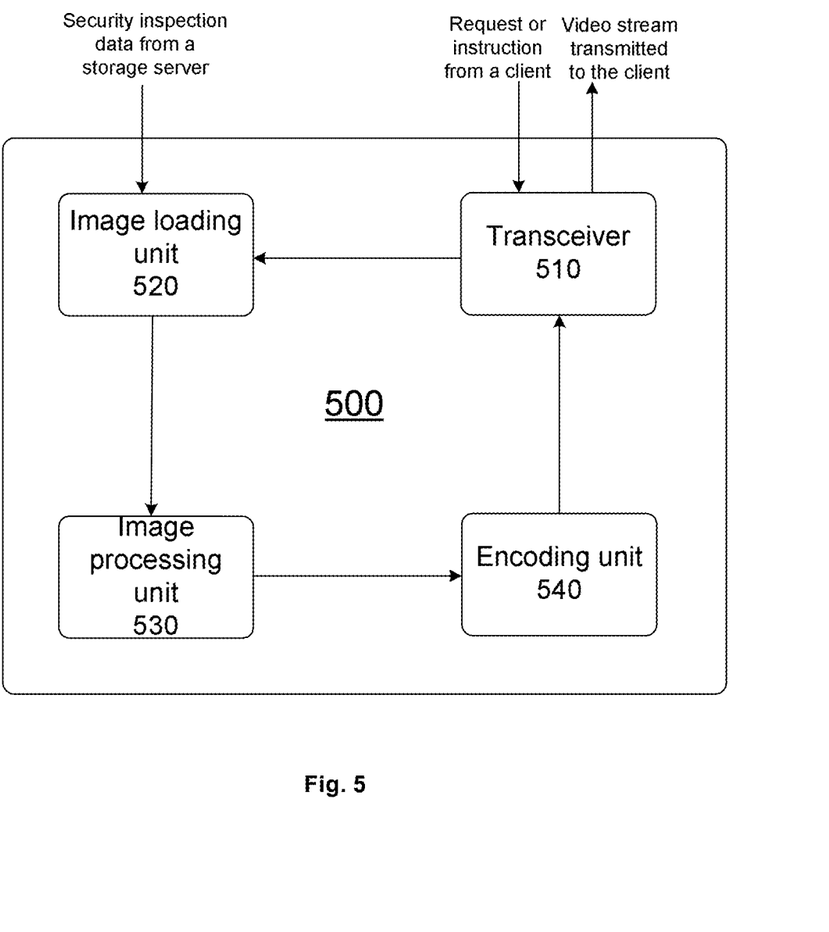
FIG. 5 illustrates a structural block diagram of a server for operating on security inspection data according to an embodiment of the disclosed technology.

FIG. 5 illustrates a structural block diagram of a server 500 for operating on security inspection data in more detail.

As shown in FIG. 5, the server 500 comprises a transceiver 510, an image loading unit 520, an image processing unit 530 and an encoding unit 540. The transceiver 510 is configured to receive an operation request for target security inspection data from a client through a network. The image loading unit 520 is connected to the transceiver 510 and is configured to load the target security inspection data from a storage server based on the operation request. The image processing unit 530 is connected to the image loading unit 520, and the image processing unit 530 comprises an image processing module and is configured to perform image processing on the target security inspection data. The encoding unit 540 is configured to encode the processed target security inspection data or a graphic interface including the processed target security inspection data. The transceiver 510 is further configured to transmit the encoded target security inspection data or graphic interface to the client through the network in a video stream.

In an embodiment, the image loading unit 520 is configured to select one of a plurality of data loading applications according to parameter information of the target security inspection data to load the target security inspection data from the storage server. Then, the image processing unit 520 is configured to perform image processing on the loaded target security inspection data using an image processing module corresponding to the selected data loading application.

In one embodiment, the initial operation instruction further comprises an image parameter instruction, and the image processing unit 520 is configured to perform, by the image processing module, image processing on the loaded target security inspection data according to the parameter information of the security inspection data and/or the image parameter instruction.

In an embodiment, the transceiver 510 is further configured to receive an additional operation instruction from the client. The image processing unit 530 is further configured to cause the image processing module to perform new image processing on the target security inspection data or graphical interface or perform additional image processing on the previously processed target security inspection data or graphical interface according to the additional operation instruction. The encoding unit 540 is further configured to encode the newly processed or additionally processed target security inspection data or graphical interface. The transceiver 510 finally transmits the encoded target security inspection data or graphic interface to the client through the network in a video stream.

It should be noted that the server 500 may correspond to the server 210 in FIG. 2 or the server 310 in FIG. 3. In the above description, the description given in connection with FIGS. 2 and 3 is equally applicable here and will not be repeated.

Figure 6:
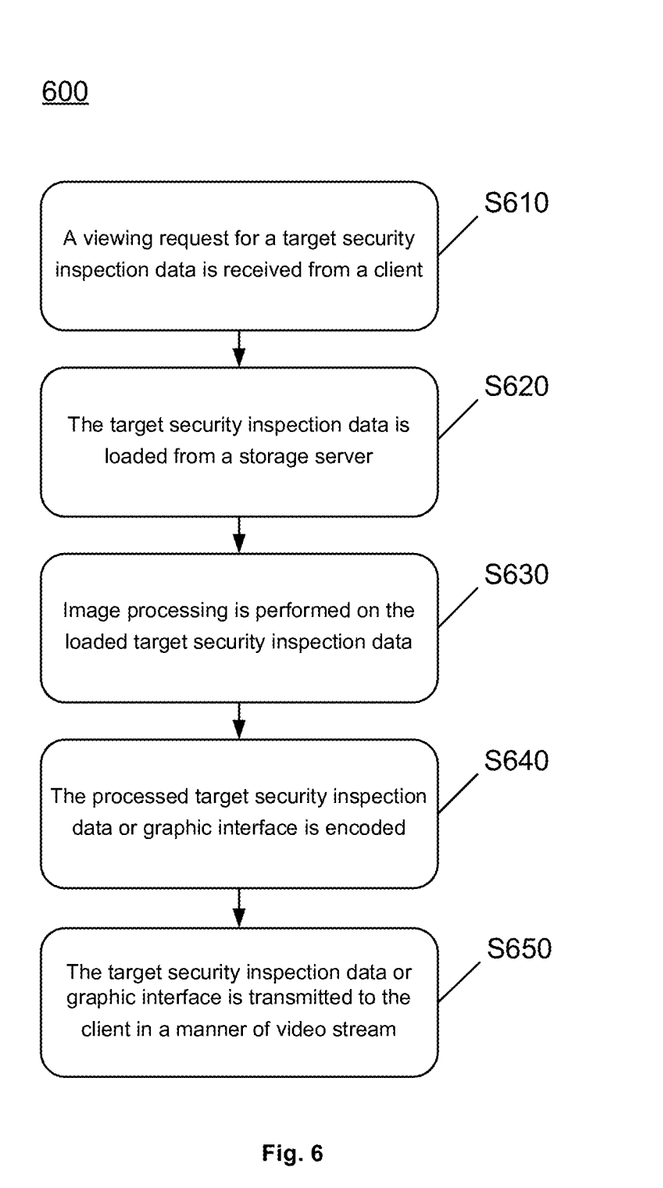
FIG. 6 illustrates a flowchart of a method performed by the server shown in FIG. 5 for operating on security inspection data.

FIG. 6 illustrates a flowchart of a method 600 performed by, for example, the server 500 shown in FIG. 5 for operating on security inspection data.

The method 600 starts at step S610, where an operation request for target security inspection data is received from a client through a network. Then, in step S620, the target security inspection data is loaded from a storage server based on the operation request. Next, in step S630, image processing is performed by an image processing module on the loaded target security inspection data. Next, in step S640, the processed target security inspection data or a graphic interface including the processed target security inspection data is encoded. Finally, in step S650, the encoded target security inspection data or graphic interface is transmitted to the client through the network in a video stream.

In an embodiment, after step S650, the method 600 may further comprise receiving an additional operation instruction from the client; performing, by a selected image processing module, new image processing on the target security inspection data or performing additional image processing on the previously processed target security inspection data according to the additional operation instruction; encoding the newly processed or additionally processed target security inspection data; and transmitting the encoded target security inspection data to the client through the network in a video stream, so that a user at the client continues to operate on the target security inspection data.

It is to be noted that various steps of the method 600 in FIG. 6 correspond to the respective components of the server in FIG. 5, and the contents in the description of FIG. 5 and also the contents in the description of FIGS. 2-4 are applicable here, and will not be repeated here. It will be understood by those skilled in the art that the detailed description of FIGS. 5 and 2-4 is incorporated into the contents for explaining various steps of the method 600 in FIG. 6 in an appropriate manner, all of which are encompassed within the scope of the disclosed technology.

It is also to be noted that the technical solutions according to the disclosed technology are applicable to a plurality of scenarios in the field of security inspection, such as a drawing scenario and a security inspection training scenario. Both of the scenarios require obtaining security inspection data acquired by the security inspection device from the storage server and viewing the security inspection data for different purposes (for example, danger investigation or learning) after image processing is performed on the security inspection data.

While the disclosed technology has been described with reference to several typical embodiments, it is apparent to those skilled in the art that the terms are used for illustration and explanation purpose and not for limitation. The disclosed technology may be practiced in various forms without departing from the spirit or essence of the disclosed technology. It should be understood that the embodiments are not limited to any of the foregoing details, and shall be interpreted broadly within the spirit and scope as defined by the attached claims. Therefore, all of changes and alternatives falling within the scope of the claims or equivalents thereof are to be encompassed by the attached claims.

The various features and processes described herein may be implemented independently of one another, or may be combined in various ways. All possible combinations and sub combinations are intended to fall within the scope of this disclosure. In addition, certain methods or process blocks may be omitted in some implementations. The methods and processes disclosed herein are also not limited to any particular sequence, and the blocks or states relating thereto can be performed in any other sequences that are appropriate. For example, described blocks or states may be performed in an order other than that specifically disclosed, or multiple blocks or states may be combined in a single block or state. The example blocks or states may be performed in serial, in parallel, or in some other manner as appropriate. Blocks or states may be added to or removed from the disclosed example embodiments as suitable. The example systems and components described herein may be configured differently than described. For example, elements may be added to, removed from, or rearranged compared to the disclosed example embodiments. Various embodiments can apply different techniques for fabricating different types of electronic devices.

While certain embodiments have been described, these embodiments have been presented by way of example only, and are not intended to limit the scope of the disclosure. Indeed, the novel devices, systems, apparatus, methods, and systems described herein may be embodied in a variety of other forms; furthermore, various omissions, substitutions and changes in the form of the methods and systems described herein may be made without departing from the spirit of the disclosure. For example, while blocks are presented in a given arrangement, alternative embodiments may perform similar functionalities with different components and/or circuit topologies, and some blocks may be deleted, moved, added, subdivided, combined, and/or modified. Each of these blocks may be implemented in a variety of different ways. Any suitable combination of the elements and acts of the various embodiments described above can be combined to provide further embodiments.

What is claimed is:

1. A method performed by a server for operating on security inspection image data, comprising:

receiving an operation request for target security inspection image data from a client through a network;

loading the target security inspection image data from a storage server based on the operation request;

performing, by an image processing module, image processing on the loaded target security inspection image data;

encoding the processed target security inspection image data or a graphic interface including the processed target security inspection image data; and transmitting the encoded target security inspection image data or graphic interface to the client through the network in a video stream, wherein the server selects one of a plurality of data loading applications according to parameter information of the target security inspection image data to load the target security inspection image data from the storage server, and wherein the server performs image processing on the loaded target security inspection image data using an image processing module corresponding to the selected data loading application.

2. The method according to claim 1, wherein the security inspection image data is acquired by a plurality of security inspection devices including a plurality of security inspection ports respectively, and the target security inspection image data is acquired by a target security inspection port located at a target security inspection device.

3. The method according to claim 1, wherein the parameter information of the security inspection image data comprises at least one of security inspection device index information, security inspection port information, security inspection image data format information and security inspection image data quality information.

4. The method according to claim 1, wherein the operation request comprises an initial operation instruction which comprises an instruction for specifying the target security inspection image data.

5. The method according to claim 4, wherein the initial operation instruction further comprises an image parameter instruction, and the step of performing, by the image processing module, image processing on the loaded target security inspection image data comprises:

performing, by the image processing module, image processing on the loaded target security inspection image data according to the parameter information of the security inspection image data and/or the image parameter instruction.

6. The method according to claim 1, wherein the storage server is a part of the server or is arranged separately from the server.

7. The method according to claim 1, wherein after the step of transmitting the encoded target security inspection image data or graphic interface to the client through the network in a video stream, the method further comprises:

receiving an additional operation instruction from the client;

performing, by the image processing module, new image processing on the target security inspection image data or graphical interface or performing additional image processing on the previously processed target security inspection image data or graphical interface according to the additional operation instruction;

encoding the newly processed or additionally processed target security inspection image data or graphical interface; and transmitting the encoded target security inspection image data or graphic interface to the client through the network in a video stream.

8. A server for operating on security inspection image data, comprising:
- a transceiver configured to receive an operation request for target security inspection image data from a client through a network;
- an image loading unit connected to the transceiver and configured to load the target security inspection image data from a storage server based on the operation request;
- an image processing unit connected to the image loading unit, comprising an image processing module and configured to perform image processing on the loaded target security inspection image data; and
- an encoding unit configured to encode the processed target security inspection image data or a graphic interface including the processed target security inspection image data,
- wherein the transceiver is further configured to transmit the encoded target security inspection image data or graphic interface to the client through the network in a video stream,
- wherein the image loading unit is configured to select one of a plurality of data loading applications according to parameter information of the target security inspection image data to load the target security inspection image data from the storage server, and
- wherein the image processing unit is configured to perform image processing on the loaded target security inspection image data using an image processing module corresponding to the selected data loading application.

9. The server according to claim 8, wherein the security inspection image data is acquired by a plurality of security inspection devices including a plurality of security inspection ports respectively, and the target security inspection image data is acquired by a target security inspection port located at a target security inspection device.

10. The server according to claim 8, wherein the parameter information of the security inspection image data comprises at least one of security inspection device index information, security inspection port information, security inspection image data format information and security inspection image data quality information.

11. The server according to claim 8, wherein the operation request comprises an initial operation instruction which comprises an instruction for specifying the target security inspection image data.

12. The server according to claim 11, wherein the initial operation instruction further comprises an image parameter instruction, and the image processing unit is further configured to:
- perform, by the image processing module, image processing on the loaded target security inspection image data according to the parameter information of the security inspection image data and/or the image parameter instruction.

13. The server according to claim 8, wherein the storage server is a part of the server or is arranged separately from the server.

14. The server according to claim 8, wherein
- the transceiver is further configured to receive an additional operation instruction from the client;
- the image processing unit is further configured to cause the image processing module to perform new image processing on the target security inspection image data or graphical interface or performing additional image processing on the previously processed target security inspection image data or graphical interface according to the additional operation instruction;
- the encoding unit is further configured to encode the newly processed or additionally processed target security inspection image data or graphical interface; and
- the transceiver is further configured to transmit the encoded target security inspection image data or graphic interface to the client through the network in a video stream.

15. A method for operating on security inspection image data, comprising:
- transmitting, by a client, an operation request for target security inspection image data to a server through a network;
- receiving, by the server, the operation request, and performing operations of:
  - loading the target security inspection image data from a storage server based on the operation request,
  - performing, by an image processing module, image processing on the loaded target security inspection image data,
  - encoding the processed target security inspection image data or a graphic interface including the processed target security inspection image data, and
  - transmitting the encoded target security inspection image data or graphic interface to the client through the network in a video stream; and
- receiving, by the client, the video stream and operating on the received video stream,
- wherein the server selects one of a plurality of data loading applications according to parameter information of the target security inspection image data to load the target security inspection image data from the storage server, and
- wherein the server performs image processing on the loaded target security inspection image data using an image processing module corresponding to the selected data loading application.

16. The method according to claim 15, wherein the security inspection image data is acquired by a plurality of security inspection devices including a plurality of security inspection ports respectively, and the target security inspection image data is acquired by a target security inspection port located at a target security inspection device.

17. The method according to claim 15,
- wherein the parameter information of the security inspection image data comprises at least one of security inspection device index information, security inspection port information, security inspection image data format information and security inspection image data quality information.

18. The method according to claim 15, wherein after the step of receiving, by the client, the video stream and operating on the received video stream, the method further comprises:
- transmitting, by the client, an additional operation instruction to the server through the network;
- receiving, by the server, the additional operation instruction and performing operations of:
  - performing new image processing on the target security inspection data or graphical interface or performing additional image processing on the previously processed target security inspection image data or graphical interface according to the additional operation instruction, encoding the newly processed or additionally processed target security inspection image data or graphical interface, and transmitting the encoded target security inspection image data or graphic interface to the client through the network in a video stream; and receiving, by the client, the video stream and operating on the received video stream.

\* \* \* \* \*